US010951527B2

(12) United States Patent
Srivastava et al.

(10) Patent No.: US 10,951,527 B2
(45) Date of Patent: Mar. 16, 2021

(54) SWITCH FABRIC PACKET FLOW REORDERING

(71) Applicant: Juniper Networks, Inc., Sunnyvale, CA (US)

(72) Inventors: Anuj Kumar Srivastava, Bangalore (IN); Gary Goldman, Los Altos, CA (US); Harshad B Agashe, Pune (IN); Dinesh Jaiswal, Bangalore (IN); Piyush Jain, New Delhi (IN); Naveen K Jain, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 46 days.

(21) Appl. No.: 16/235,874

(22) Filed: Dec. 28, 2018

(65) Prior Publication Data
US 2020/0213232 A1 Jul. 2, 2020

(51) Int. Cl.
*H04L 12/801* (2013.01)
*H04L 12/947* (2013.01)

(52) U.S. Cl.
CPC .............. *H04L 47/12* (2013.01); *H04L 49/25* (2013.01)

(58) Field of Classification Search
CPC ................................ H04L 47/12; H04L 49/25
See application file for complete search history.

(56) References Cited

U.S. PATENT DOCUMENTS 5,260,934 A * 11/1993 Tanaka ................... H04L 12/56
340/2.6
5,612,863 A 3/1997 De Lange
6,404,740 B1 6/2002 Yoshida
6,654,373 B1 * 11/2003 Maher, III .......... H04L 47/2441
370/392
6,661,773 B1 12/2003 Pelissier et al.
7,102,999 B1 9/2006 Sindhu et al.
(Continued)

FOREIGN PATENT DOCUMENTS

CN 102263646 A 11/2011
CN 102487358 A 6/2012
(Continued)

OTHER PUBLICATIONS

Montano, "Network Fabric Implications for Data Center Design," Juniper Networks, Inc., Nov. 2, 2010, 84 pp.
(Continued)

*Primary Examiner* — Stephen J Clawson
(74) *Attorney, Agent, or Firm* — Shumaker & Sieffert, P.A.

(57) ABSTRACT

An ingress fabric endpoint coupled to a switch fabric within a network device reorders packet flows based on congestion status. In one example, the ingress fabric endpoint receives packet flows for switching across the switch fabric. The ingress fabric endpoint assigns each packet for each packet flow to a fast path or a slow path for packet switching. The ingress fabric endpoint processes, to generate a stream of cells for switching across the switch fabric, packets from the fast path and the slow path to maintain a first-in-first-out ordering of the packets within each packet flow. The ingress fabric endpoint switches a packet of a first packet flow after switching a packet of a second packet flow despite receiving the packet of the first packet flow before the packet of the second packet flow.

18 Claims, 8 Drawing Sheets

(56) References Cited

U.S. PATENT DOCUMENTS

| | | |
|---|---|---|
| 8,050,559 B2 | 11/2011 | Sindhu |
| 8,325,726 B2 | 12/2012 | Baban et al. |
| 8,902,780 B1 | 12/2014 | Hegde et al. |
| 8,953,605 B1 | 2/2015 | Mehra |
| 9,350,696 B2* | 5/2016 | Zhang ................... H04L 61/103 |
| 9,660,940 B2 | 5/2017 | Anand et al. |
| 9,769,016 B2 | 9/2017 | Vobbilisetty et al. |
| 9,866,427 B2 | 1/2018 | Yadav et al. |
| 10,164,906 B1 | 12/2018 | Ramanujam et al. |
| 10,382,254 B2 | 8/2019 | Yadav et al. |
| 2001/0048690 A1* | 12/2001 | Magill ................. H04L 12/5601 370/415 |
| 2002/0089926 A1 | 7/2002 | Kloth |
| 2003/0035372 A1* | 2/2003 | Schaub ............... H04L 47/6205 370/230 |
| 2003/0035374 A1* | 2/2003 | Carter .................... H04L 45/00 370/235 |
| 2003/0043810 A1* | 3/2003 | Boduch ............... H04L 12/5601 370/395.1 |
| 2003/0063839 A1 | 4/2003 | Kaminski et al. |
| 2003/0067879 A1* | 4/2003 | Masunaga ............... H04L 47/11 370/235 |
| 2003/0112749 A1 | 6/2003 | Hassink et al. |
| 2003/0142624 A1* | 7/2003 | Chiussi ............... H04L 12/5601 370/235 |
| 2003/0152027 A1 | 8/2003 | Takagi |
| 2004/0081083 A1 | 4/2004 | Sekihata |
| 2005/0259672 A1* | 11/2005 | Eduri .................... G06F 13/385 370/412 |
| 2006/0098589 A1* | 5/2006 | Kreeger ................. H04L 45/48 370/256 |
| 2006/0274673 A1 | 12/2006 | Fleury et al. |
| 2007/0008985 A1* | 1/2007 | Lakshmanamurthy ..................... H04L 49/1523 370/412 |
| 2008/0044181 A1* | 2/2008 | Sindhu ................. H04L 49/102 398/49 |
| 2008/0212482 A1* | 9/2008 | Nakayma ................ H04L 47/10 370/237 |
| 2011/0161489 A1 | 6/2011 | Bhatt et al. |
| 2011/0228782 A1 | 9/2011 | Liaw et al. |
| 2011/0292813 A1 | 12/2011 | Dunbar et al. |
| 2011/0299402 A1 | 12/2011 | Vobbilisetty et al. |
| 2012/0051738 A1 | 3/2012 | Skirmont et al. |
| 2016/0112303 A1 | 4/2016 | Yoo |
| 2016/0337725 A1 | 11/2016 | Graves |
| 2018/0131561 A1 | 5/2018 | Yadav et al. |

FOREIGN PATENT DOCUMENTS

| | | |
|---|---|---|
| EP | 0511834 A2 | 11/1992 |
| EP | 2369782 A1 | 9/2011 |
| EP | 2680510 A1 | 1/2014 |
| EP | 3057334 A1 | 8/2016 |

OTHER PUBLICATIONS

Semeria, "T-series Routing Platforms: System and Packet Forwarding Architecture," Juniper White Paper, Juniper Networks, Inc., Apr. 2002, 22 pp.

* cited by examiner

SWITCH FABRIC PACKET FLOW REORDERING

TECHNICAL FIELD

The disclosure relates to computer networks and, more particularly, to communicating packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

A variety of types of routers exist within the Internet. Network Service Providers (NSPs), for example, maintain "edge routers" to provide Internet access and other services to the customers. Examples of services that the NSP may provide include Voice over IP (VoIP), access for Asynchronous Transfer Mode (ATM) or frame relay communications, Internet protocol (IP) data services, and multimedia services, such as video streaming. The edge routers of the NSPs often communicate network traffic to high-speed "core routers," which may be generally viewed as forming the backbone of the Internet. These core routers often include substantially more processing resources than the edge routers and are designed to handle high volumes of network traffic.

In some examples, a core router or another router or switching device may employ a distributed, multi-stage switch fabric architecture, in which network packets traverse multiple stages of the switch fabric located in distributed forwarding components of the router to travel from an ingress point of the switch fabric to an egress point of the switch fabric. As one example, a switch fabric may be implemented as a single multi-stage Clos switch fabric, which relays packets across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches—often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may viewed as an independent portion of the multi-stage Clos switch fabric, where each plane provides switching redundancy.

A switch fabric switches packets among multiple fabric endpoints. Typically, each fabric endpoint is able to use the switch fabric to reach and send packets to any other fabric endpoint connected to the switch fabric. In some examples, fabric endpoints exchange data units known as "cells," with each cell having a sequence number that defines a position of the cell in a sequence of cells. The sequence of cells from an ingress fabric endpoint to an egress fabric endpoint is known as a cell stream.

SUMMARY

In general, techniques are described for reordering, to produce a cell stream, packets from packets flows based on a congestion status of each packet flow to allow packets of uncongested packet flows to bypass packets of congested packet flows in the cell stream. An ingress fabric endpoint receives a plurality of packet flows and processes the packet flows to generate a stream of discrete data units known as "cells," for switching across the switch fabric to an egress fabric endpoint. The ingress fabric endpoint stamps each cell with a sequence number that defines a position of the cell in a sequence of cells that forms a cell stream to a particular egress fabric endpoint. The packets within a particular packet flow should be processed by the ingress fabric endpoint and switched to the egress fabric endpoint according to a first-in-first-out (FIFO) ordering of the packets to ensure integrity of the packet flow. The techniques described herein permit a non-FIFO ordering for packets from different packet flows.

For example, an ingress fabric endpoint coupled to a switch fabric within a network device may use a congestion status of a packet flow to assign packets of the packet flow to a fast path for packet switching or a slow path for packet switching to allow packets of uncongested packet flows to bypass packets of congested packet flows. The ingress fabric endpoint receives packet flows for switching across the switch fabric to an egress fabric endpoint. The ingress fabric endpoint assigns packets for each packet flow of the received packet flows to one of a fast path for packet switching or a slow path for packet switching based at least on a congestion status of the packet flow. In some examples, the fast path uses an internal memory of the network device to buffer packets for internal switching, while the slow path uses an external memory of the network device for internal switching.

The ingress fabric endpoint processes packets from the fast path and the slow path to generate a stream of cells for switching across the switch fabric to the egress fabric endpoint while maintaining a FIFO ordering of the packets within each packet flow but not a FIFO ordering of packets of different packet flows. In this way, the ingress fabric endpoint preserves the correct ordering of packets within each packet flow but allows packets of uncongested packet flows, assigned to the fast path, to bypass packets of congested packet flows, assigned to the slow path, to prevent the congested packet flows from impacting the throughput of uncongested packet flows.

The packet reordering techniques described herein may provide one or more specific technical improvements to the computer-related field of network traffic forwarding. For example, because a fabric endpoint can reorder packets of a packet flow with respect packets of other packet flows, the techniques may improve the throughput of the network device by allowing packets of uncongested packet flows to bypass packets of congested packet flows, which would otherwise block packets of uncongested packet flows under a strict FIFO ordering. Further, the techniques of the disclosure may allow a fabric endpoint to efficiently use both low-latency, internal memory and expandable, higher-latency external memory so as to improve the scalability of the fabric endpoint by increasing the number of simultaneous packet flows that the fabric endpoint may process, without the fabric endpoint becoming bottlenecked by higher latencies imposed by the use of external memories. Accordingly, the techniques of the disclosure may lead to improved packet flow throughput, more efficient usage of memory of the network device, and better resource utilization overall.

In some examples, a method is described comprising: receiving, by an ingress fabric endpoint of a plurality of fabric endpoints coupled to a switch fabric within a network device to exchange cells, a plurality of packet flows for switching across the switch fabric to an egress fabric endpoint of the plurality of fabric endpoints for the packet flows; assigning, by the ingress fabric endpoint, each packet for each packet flow of the plurality of packet flows to one of a fast path for packet switching or a slow path for packet switching; and processing, by the ingress fabric endpoint to generate a stream of cells for switching across the switch fabric to the egress fabric endpoint, packets from the fast path and the slow path to maintain a first-in-first-out ordering of the packets within each packet flow of the plurality of packet flows and to switch a packet of a first packet flow of the packet flows after switching a packet of a second packet flow of the packet flows despite the packet of the first packet flow being received by the ingress fabric endpoint before the packet of the second packet flow.

In some examples, a network device is described comprising: a plurality of fabric endpoints coupled to a switch fabric within the network device to exchange cells, an ingress fabric endpoint of the plurality of fabric endpoints configured to: receive a plurality of packet flows for switching across the switch fabric to an egress fabric endpoint of the plurality of fabric endpoints for the packet flows; assign each packet for each packet flow of the plurality of packet flows to one of a fast path for packet switching or a slow path for packet switching; and process, to generate a stream of cells for switching across the switch fabric to the egress fabric endpoint, packets from the fast path and the slow path to maintain a first-in-first-out ordering of the packets within each packet flow of the plurality of packet flows and to switch a packet of a first packet flow of the packet flows after switching a packet of a second packet flow of the packet flows despite the packet of the first packet flow being received by the ingress fabric endpoint before the packet of the second packet flow.

In some examples, a non-transitory, computer-readable medium is described comprising instructions that, when executed, are configured to cause one or more processors of a network device to execute an ingress fabric endpoint of a plurality of fabric endpoints coupled to a switch fabric within the network device to exchange cells, the ingress fabric endpoint configured to: receive a plurality of packet flows for switching across the switch fabric to an egress fabric endpoint of the plurality of fabric endpoints for the packet flows; assign each packet for each packet flow of the plurality of packet flows to one of a fast path for packet switching or a slow path for packet switching; and process, to generate a stream of cells for switching across the switch fabric to the egress fabric endpoint, packets from the fast path and the slow path to maintain a first-in-first-out ordering of the packets within each packet flow of the plurality of packet flows and to switch a packet of a first packet flow of the packet flows after switching a packet of a second packet flow of the packet flows despite the packet of the first packet flow being received by the ingress fabric endpoint before the packet of the second packet flow.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote elements throughout the figures and text.

DETAILED DESCRIPTION

Figure 1:
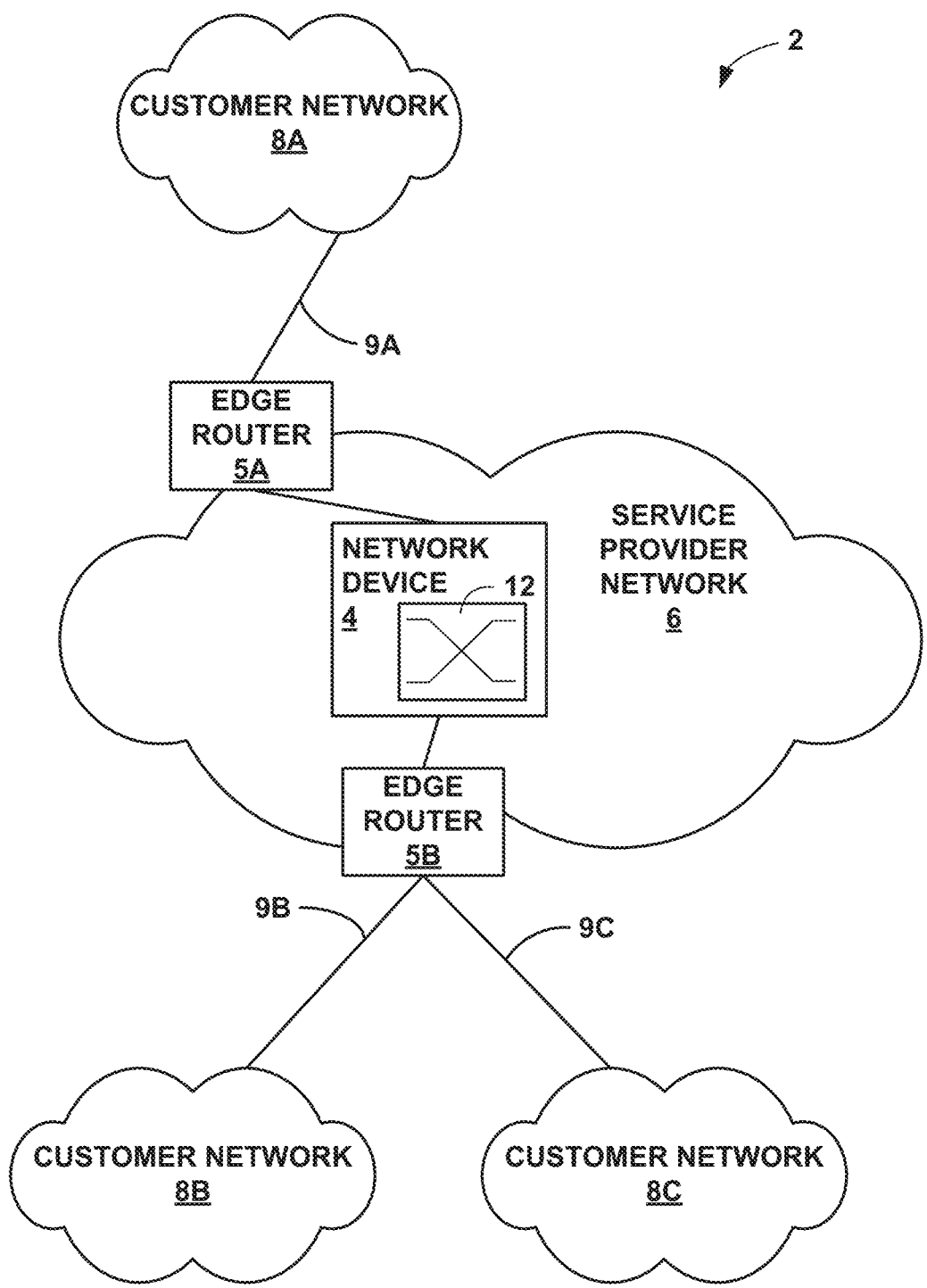
FIG. 1 is a block diagram illustrating an example network environment in which a service provider network includes a network device configured to perform packet reordering in accordance with techniques described in this disclosure.

FIG. 1 is a block diagram illustrating an example network environment in which a service provider network includes a network device configured to perform fabric reordering in accordance with techniques described in this disclosure. For purposes of example, the principles of the invention are described with respect to a simplified network environment 2 of FIG. 1 in which network device 4 communicates with edge routers 5A and 5B ("edge routers 5") to provide customer networks 8A-8C ("customer networks 8") with access to service provider network 6. Network device 4 may represent a router that exchanges routing information with edge routers 5 in order to maintain an accurate representation of the topology of network environment 2. Network device 4 may consist of a plurality of cooperative routing components operating as a single node within service provider network 6. Network device 4 may alternatively represent an L2 and/or L3 switch, or any other device that includes an internal switching fabric for internally switching packets among fabric endpoints of the device.

Although not illustrated, service provider network 6 may be coupled to one or more networks administered by other providers and may thus form part of a large-scale public network infrastructure, e.g., the Internet. Consequently, customer networks 8 may be viewed as edge networks of the Internet. Service provider network 6 may provide computing devices within customer networks 8 with access to the Internet and may allow the computing devices within customer networks 8 to communicate with each other. In another example, service provider network 6 may provide network services within the core of the Internet. In either case, service provider network 6 may include a variety of network devices (not shown) other than network device 4 and edge routers 5, such as additional routers, switches, servers, or other devices.

In the illustrated example, edge router 5A is coupled to customer network 8A via access link 9A, and edge router 5B is coupled to customer networks 8B and 8C via access links 9B and 9C, respectively. Customer networks 8 may be networks for geographically separated sites of an enterprise. Customer networks 8 may include one or more computing devices (not shown), such as personal computers, laptop computers, handheld computers, workstations, servers, switches, printers, customer data centers or other devices. The configuration of network environment 2 illustrated in FIG. 1 is merely an example. Service provider network 6 may be coupled to any number of customer networks 8. Nonetheless, for ease of description, only customer networks 8A-8C are illustrated in FIG. 1. Many different types of networks besides service provider network may employ an instance of network device 4, including customer/enterprise networks, transport networks, aggregation or access networks, and so forth.

Network device 4 may include multiple chassis (not shown in FIG. 1) that are physically coupled and configured to operate as a single router. In such examples and to edge routers 5 of network environment 2, network device 4 appears as a single routing device. For example, although network device 4 may include a plurality of chassis, from the perspective of peer routers 5, network device 4 has one or more unified host network addresses and maintains single peer routing sessions for each routing protocol maintaining peer routing sessions with each of the edge routers 5. Additional details regarding an example of a multi-chassis router having a multi-stage switch fabric are found in Pradeep S. Sindhu, U.S. Patent Publ. No. 2008/0044181 A1, entitled "Multi-chassis router with multiplexed optical interconnects" and published Feb. 21, 2008, which is incorporated by reference in its entirety.

As described in further detail below, network device 4 forwards packets, i.e., network traffic, on a data plane of network device 4 using an internal multi-stage switch fabric 12 that interconnects fabric endpoints within the network device, the fabric endpoints themselves connected to network interface cards (e.g., port interface cards) of the network device. In other words, fabric endpoints in communication with the network interfaces switch packets to one another via the switch fabric 12. In the example of FIG. 1, the multi-stage switch fabric 12 switches data units from ingress fabric endpoints in communication with ingress ports of the network interface cards to the egress fabric endpoints in communication with egress ports of the network interface cards to perform high-speed packet forwarding among the forwarding units of the network device 4. Multi-stage switch fabric 12 may represent a 3-stage Clos network, a 5-stage Clos network, or an n-stage Clos network for any value of n. Fabric endpoints can be an ingress fabric endpoint for a given packet and an egress fabric endpoint for another given packet.

In general, fabric endpoints divide packets received at an ingress port into one or more fixed-length cells for switching. However, in some instances packets may be divided into variable-length data units for switching or switched intact as respective data units. A "data cell" or "cell" refers to a smallest block of data that is passed through the multi-stage switch fabric 12. The cell includes a header portion and a data portion. "Cell data" refers to data contained within a data portion of a cell. The header portion includes at least a source identifier indicating the ingress fabric endpoint of the cell and a sequence number. As used throughout this description unless specifically indicated otherwise, "cell" may refer to any unit of data switched by a multi-stage switch fabric.

The multi-stage switch fabric 12 offers multiple possible switch paths between each ingress fabric endpoint and an egress fabric endpoint to facilitate non-blocking switching. As a result of the differing latencies that individual cells may experience across the multiple paths that are available from an ingress fabric endpoint to an egress fabric endpoint, cells received at the egress fabric endpoint may arrive out of order relative to the sequence in which the cells were dispatched by the ingress fabric endpoint. The egress fabric endpoint therefore reorders the cells prior to processing in order to process the cells in the correct ordering. As noted above and to facilitate reordering, each cell includes a sequence number field. A fabric endpoint may receive a different stream of cells ("cell stream") from each fabric endpoint of network device, including at least in some cases from the fabric endpoint itself.

In accordance with techniques described herein, network device 4 reorders, to produce a cell stream, packets from packets flows based on a congestion status of each packet flow to allow packets of uncongested packet flows to bypass packets of congested packet flows in the cell stream. As explained in further detail below, an ingress fabric endpoint (not depicted in FIG. 1) of network device 4 receives a plurality of packet flows and processes the packet flows to generate a stream of discrete data units known as "cells," for switching across the switch fabric to an egress fabric endpoint of network device 4 (not depicted in FIG. 1). The ingress fabric endpoint stamps each cell with a sequence number that defines a position of the cell in a sequence of cells that forms a cell stream to a particular egress fabric endpoint. The packets within a particular packet flow should be processed by the ingress fabric endpoint and switched to the egress fabric endpoint according to a FIFO ordering of the packets to ensure integrity of the packet flow. The techniques described herein permit a non-FIFO ordering for packets from different packet flows.

For example, an ingress fabric endpoint coupled to a switch fabric within network device 4 may use a congestion status of a packet flow to assign packets of the packet flow to a fast path for packet switching or a slow path for packet switching to allow packets of uncongested packet flows to bypass packets of congested packet flows. The ingress fabric endpoint receives packet flows for switching across the switch fabric to an egress fabric endpoint of network device 4. The ingress fabric endpoint assigns packets for each packet flow of the received packet flows to one of a fast path for packet switching or a slow path for packet switching based at least on a congestion status of the packet flow. In some examples, the fast path uses an internal memory of network device 4 to buffer packets for internal switching, while the slow path uses an external memory of network device 4 for internal switching.

The ingress fabric endpoint processes packets from the fast path and the slow path to generate a stream of cells for switching across the switch fabric to the egress fabric endpoint while maintaining a FIFO ordering of the packets within each packet flow but not a FIFO ordering of packets of different packet flows. In this way, the ingress fabric endpoint preserves the correct ordering of packets within each packet flow but allows packets of uncongested packet flows, assigned to the fast path, to bypass packets of congested packet flows, assigned to the slow path, to prevent the congested packet flows from impacting the throughput of uncongested packet flows.

The packet reordering techniques described herein may provide one or more specific technical improvements to the computer-related field of network traffic forwarding. For example, because a fabric endpoint can reorder packets of a packet flow with respect to packets of other packet flows, the techniques may improve the throughput of network device 4 by allowing packets of uncongested packet flows to bypass packets of congested packet flows, which would otherwise block packets of uncongested packet flows under a strict FIFO ordering. Further, the techniques of the disclosure may allow a fabric endpoint to efficiently, use both low-latency, internal memory and expandable, higher-latency external memory so as to improve the scalability of the fabric endpoint by increasing the number of simultaneous packet flows that the fabric endpoint may process, without the fabric endpoint becoming bottlenecked by higher latencies imposed by the use of external memories. Accordingly, the techniques of the disclosure may lead to faster traffic flow throughput, more efficient usage of memory of the network device, and better resource utilization overall.

Figure 2:
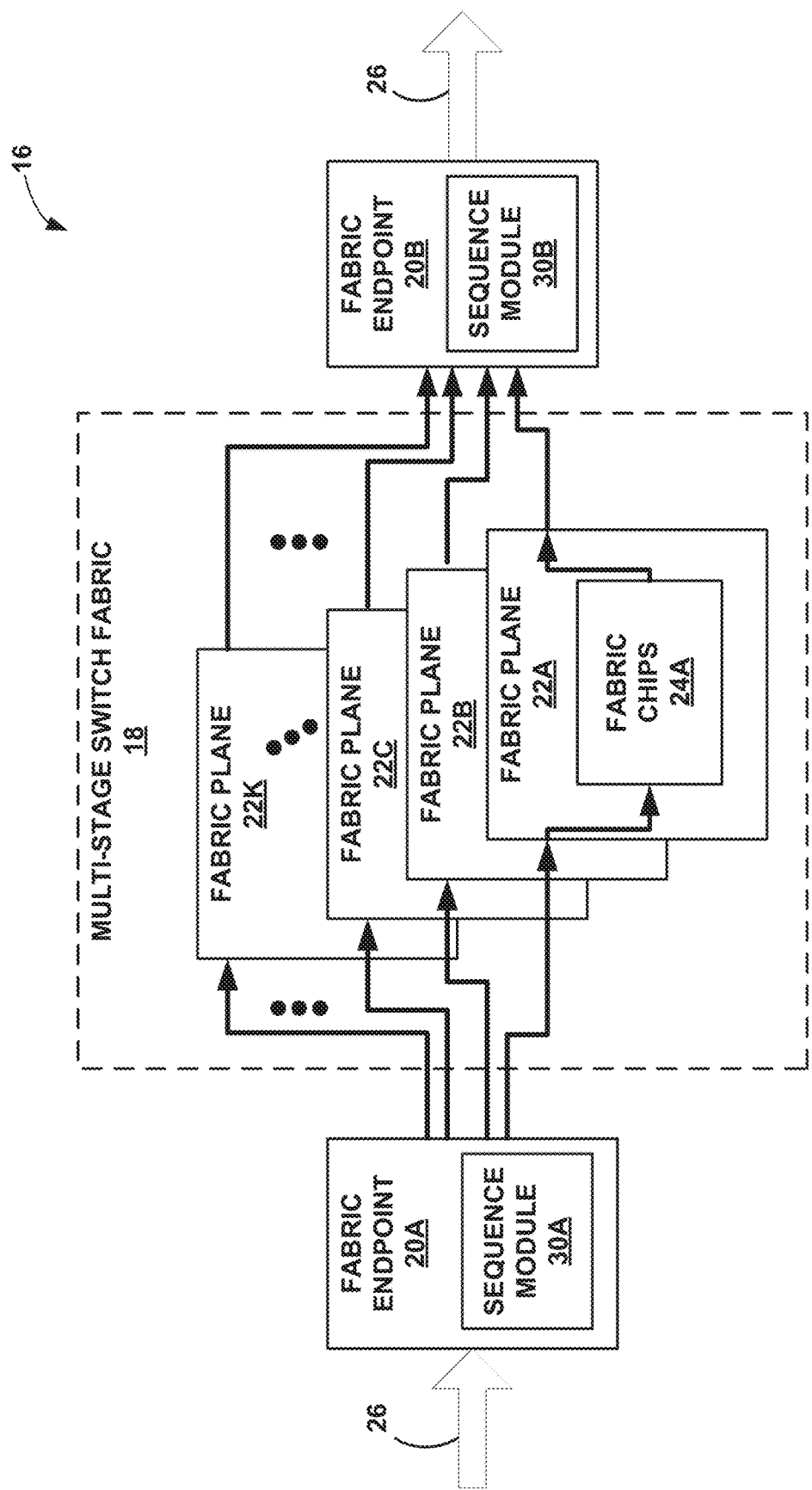
FIG. 2 is a block diagram illustrating an example of a switching system according to techniques described herein.

FIG. 2 is a block diagram illustrating an example of a switching system according to techniques described herein. Multi-stage switch fabric 18 ("fabric 18") of switching system 16 may represent an example instance of multi-stage switch fabric 12 of the network device 4 of FIG. 1. Fabric endpoints 20A, 20B (collectively, "fabric endpoints 20") of switching system 16 and separately coupled to each of fabric planes 22A-22K of multi-stage switch fabric 18 operate as sources and/or destinations of data units (e.g., cells) switched by fabric 18. In the illustrated example, ingress fabric endpoint 20A sends, ingresses, originates, or otherwise sources packets 26 for switching via multi-stage switch fabric 18 to egress fabric endpoint 20B that receives, egresses, consumes, or otherwise sinks packets 26. Although FIG. 2 illustrates only two fabric endpoints, switching system 16 may include many hundreds of fabric endpoints, or more. In some examples, switching system 16 includes 96 fabric endpoints in communication with multi-stage switch fabric 18. In such examples, any given fabric endpoint 20 may receive cells for cell streams sourced by 96 different fabric endpoints 20.

Although each of fabric endpoints 20 typically operates as both an ingress and an egress for cells, any of fabric endpoints 20 may be either an ingress or an egress for cells in various instances. In some examples, fabric endpoints 20 may each represent a packet forwarding engine or other forwarding unit such that fabric endpoints 20 collectively implement a distributed forwarding plane for a packet switching device (e.g., network device 4). In some examples, fabric endpoints 20 may represent fabric interfaces for servers or other hosts (e.g., virtual machines) that exchange packets for a distributed application via fabric 18. Fabric endpoints 20 may include respective switch fabric interfaces or "switch interfaces" (SIs—not shown) to provide queuing for cells being switched via fabric 18, among other operations.

In this example, multi-stage switch fabric 18 includes a plurality of operationally independent, parallel switch fabric planes 22A-22K (illustrated as "fabric planes 22A-22K") and referred to herein collectively as "fabric planes 22"). The number of fabric planes 22 may be any number, dependent upon the respective capacities of the fabric planes 22 and the fabric bandwidth needed. Fabric planes 22 may include 4, 5, or 18 planes, for instance. In some examples, fabric plane 22K operates as a backup or spare fabric plane to the remaining fabric planes 22. Each of fabric planes 22 includes similar components for implementing an independent Clos or other multi-stage switch network (e.g., a Benes network) to provide independent switching bandwidth to fabric endpoints 20, said components and functionality being described hereinafter primarily with respect to fabric plane 22A. Fabric planes 22 are operationally independent in that a failure of one of fabric planes 22 does not affect the switching ability of the remaining, operational fabric planes. Each of fabric planes 22 may provide non-blocking connectivity. Additional details regarding an example of a multi-stage switch fabric having a plurality of switch planes are found in Pradeep S. Sindhu, U.S. Pat. No. 7,102,999, entitled "Switching Device" and filed Nov. 24, 1999, which is incorporated by reference in its entirety.

Each of fabric planes 22 includes an input port coupled to fabric endpoint 20A and an output port coupled to fabric endpoint 20B. Although only one ingress fabric endpoint 20A and one egress fabric endpoint 20B is illustrated for simplicity, each fabric plane 22 typically includes multiple input ports and output ports coupled to respective fabric endpoints. When a fabric endpoint 20A obtains a packet, the fabric endpoint 20A performs a lookup operation to determine fabric endpoint 20B (in this example) is an egress for the packet. Obtaining a packet may refer to receiving a packet from the network or host, or originating a packet, for instance. Fabric endpoint 20A optionally divides the packet into cells and forwards the packet/cells across multi-stage fabric 18 to fabric endpoint 20B. Fabric endpoint 20A selects different fabric planes 22 to switch the cells to distribute the bandwidth load across the fabric planes 22.

Fabric endpoints 20A, 20B may employ a request/grant protocol to transmit a data cell across fabric 18. In such cases, ingress fabric endpoint 20A transmits a request across fabric 18 to the egress fabric endpoint 20B. Fabric endpoint 20A transmits each such request across a different one of fabric planes 22 in a round-robin or other balancing order to fairly distribute the transport load. In response to receiving the request, fabric endpoint 20B transmits a grant to the fabric endpoint 20A across the same fabric plane 22 on which fabric endpoint 20B received the corresponding request. In response to receiving the grant, fabric endpoint 20A transmits the data cell to the fabric endpoint 20B across the same fabric plane 22 on which fabric endpoint 20A issued the corresponding request.

As noted above, each of fabric planes 22 may include similar components to perform similar multi-stage switch functionality. Fabric plane 22A, as an example, includes a plurality of fabric chips 24 coupled by fabric chip-to-chip links (CCLs—not shown) to implement a multi-stage switch fabric for the fabric plane 224. Fabric chips 24A may be distributed among various switching devices, chassis, etc., of the switching system 16. Each of fabric chips 24A may include an application-specific integrated circuit (ASIC) and may be referred to as a "fabric ASIC." Each fabric chip may perform the switching functionality for one or more stage switches and may represent, e.g., a crossbar switch.

In some examples, fabric endpoints 20A-20B include respective fabric reorder modules to reorder cells received from other fabric endpoints 20. For instance, fabric endpoint 20B operating as an egress fabric endpoint receives, from ingress fabric endpoint 20A, cells in a disordered sequence according to the sequence numbers of the cells and according to the times as which cells were sent by ingress fabric endpoint 20A, which incrementally increases the sequence number with each cell sent for the cell stream to a particular egress fabric endpoint (here, fabric endpoint 20B). Fabric endpoint 20B may perform cell reordering on different subsequences of a cell stream, to detect missing or skipped cells, and to detect and facilitate robust recovery from other error conditions. Additional information on cell reordering may be found in U.S. Pat. No. 9,866,427 to Yadav, et al., entitled "MULTI-STAGE SWITCH FABRIC FAULT DETECTION AND HANDLING," filed on Feb. 16, 2015 and issued on Jan. 9, 2018, the entire content of which is incorporated herein by reference.

In accordance with the techniques of the disclosure, fabric endpoints 20A-20B include respective sequence modules 30A-30B (collectively, "sequence modules 30") use a congestion status of a packet flow to assign packets of the packet flow to a fast path for packet switching or a slow path for packet switching to allow packets of uncongested packet flows to bypass packets of congested packet flows. Ingress fabric endpoint 20A receives packet flows for switching across switch fabric 18 to egress fabric endpoint 20B. Sequence module 30A of ingress fabric endpoint 20A assigns packets for each packet flow of the received packet flows to one of a fast path for packet switching or a slow path for packet switching based at least on a congestion status of the packet flow. In some examples, the fast path uses an internal memory of network device 4 to buffer packets for internal switching, while the slow path uses an external memory of network device 4 for internal switching.

Sequence module 30A processes packets from the fast path and the slow path to generate a stream of cells for switching across switch fabric 18 to egress fabric endpoint 20B while maintaining a FIFO ordering of the packets within each packet flow but not a FIFO ordering of packets of different packet flows. In this way, ingress fabric endpoint 20A preserves the correct ordering of packets within each packet flow but allows packets of uncongested packet flows, assigned to the fast path, to bypass packets of congested packet flows, assigned to the slow path, to prevent the congested packet flows from impacting the throughput of uncongested packet flows.

The packet reordering techniques described herein may provide one or more specific technical improvements to the computer-related field of network traffic forwarding. For example, because a fabric endpoint can reorder packets of a packet flow with respect to packets of other packet flows, the techniques may improve the throughput of the network device by allowing packets of uncongested packet flows to bypass packets of congested packet flows, which would otherwise block packets of uncongested packet flows under a strict FIFO ordering. Further, the techniques of the disclosure may allow a fabric endpoint to efficiently use both low-latency, internal memory and expandable, higher-latency external memory so as to improve the scalability of the fabric endpoint by increasing the number of simultaneous packet flows that the fabric endpoint may process, without the fabric endpoint becoming bottlenecked by higher latencies imposed by the use of external memories. Further, ingress fabric endpoint 20A may use high-speed internal memory to buffer uncongested packet flows so as to ensure that the uncongested packet flows are processed and forwarded to switch fabric 18 as quickly as possible. In contrast, ingress fabric endpoint 20A may use slower-speed external memory to buffer congested packet flows which are not yet ready for processing and forwarding to switch fabric 18.

Figure 3:
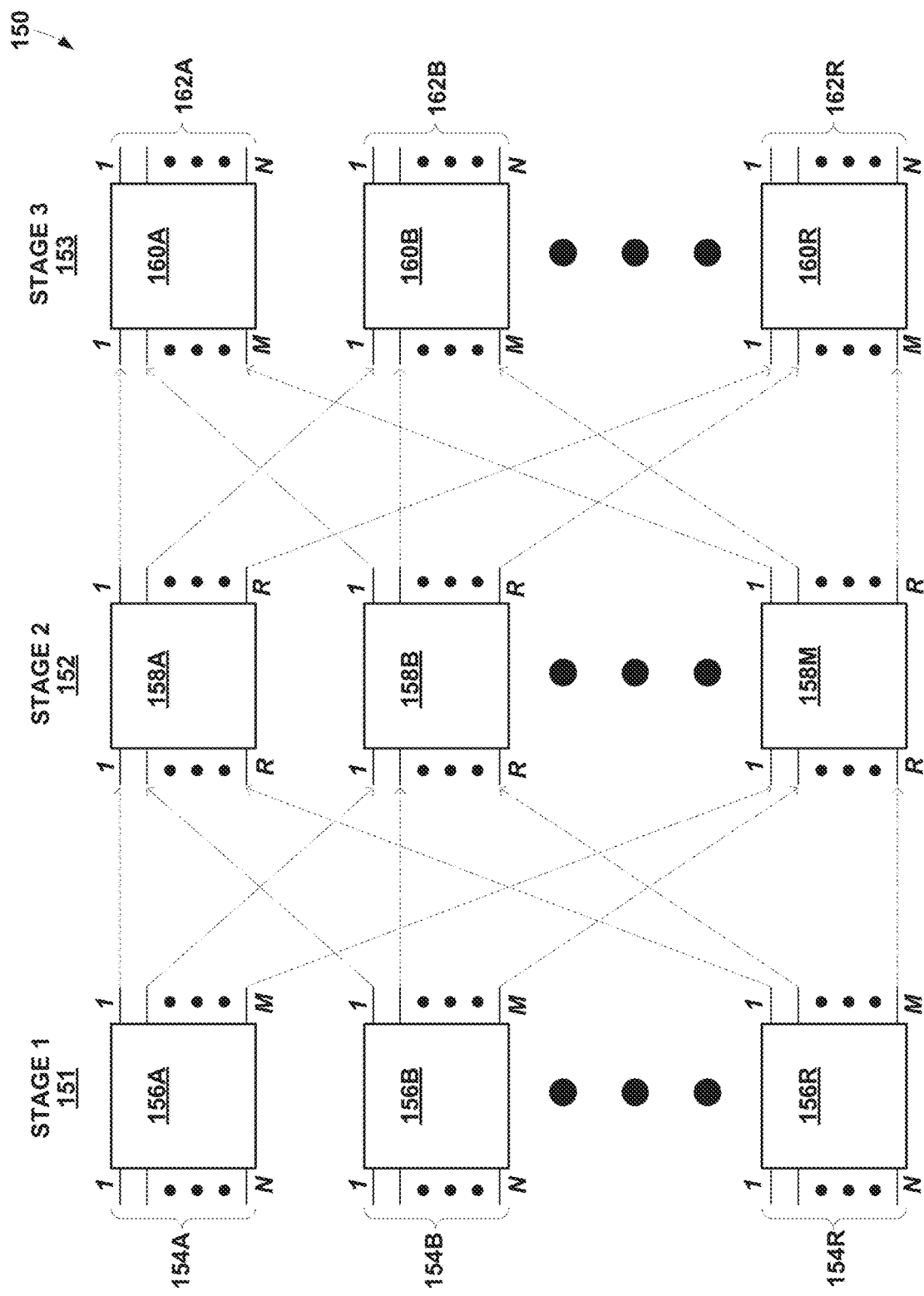
FIG. 3 is a block diagram illustrating a logical representation of a three-stage switching network.

FIG. 3 is a block diagram illustrating a logical representation of a three-stage switching network 150 (or "switch fabric 150") that operates in accordance with techniques described herein. Three-stage network 150 may logically represent switch fabric 12 of FIG. 1, switch fabric 18 of FIG. 2, or another switch fabric in which components or devices are interconnected to provide a multi-stage switch fabric. The three stages of the example network 150 of FIG. 3 include: stage 1 151 consisting of crossbar switches 156A-156R (collectively "switches 156"), stage 2 152 consisting of crossbar switches 158A-158M (collectively "switches 158"), and stage 3 consisting of crossbar switches 160A-160R (collectively "switches 160"). Switches 156 receive data packets via inputs 154N-154N (collectively "inputs 154"), there are a total of N×R inputs 154 in this example. Switches 160 send the data packets via output ports 162A-162N (collectively "outputs 162"); there are a total of N×R outputs 162 in this example.

As shown in FIG. 3, stage 1 151 and stage 3 153 each include R crossbar switches, while stage 2 152 includes M crossbar switches. Three-stage network in coupled to N inputs and N outputs, thus completing the characterization of the Clos network. The integer values for M and N define blocking characteristics of three-stage switching network 150. For example, stage 2 152 may include more crossbar switches than stage 1 151 and stage 3 153 (i.e., M>R) to reduce or eliminate the possibility that an open one of inputs 154 could be blocked from an open one of outputs 162.

Each of switches 156, 158, 160 may be implemented by a fabric chip. In some cases, corresponding stage 1 switches 156 and stage 3 switches 160 (e.g., switch 156A and switch 160A) may be implemented by a same fabric chip. As described with respect to multi-chassis router 150 of FIG. 3, stage 1 151 and stage 3 153 may be located in a plurality of LCCs, while stage 2 152 is located in an SCC.

To establish a path through network 150 from one of inputs 154 to the intended output 162, the one of switches 156 associated with the receiving input 154 determines an available stage 2 152 switch 158 that allows a connection path to the stage 3 153 switch 160 including the intended output 162. For example, assume a packet received by switch 156A is to be relayed to one of outputs 162A on switch 160A. Switch 156A selects any of switches 158 with an open connection to both switch 156A and switch 160A. Assume switch 156A selects switch 158B. Once switch 158B receives the data packet, switch 158B determines an available path to switch 160A and forwards the data packet to switch 160A. For example, switch 158B may have more than one open path to switch 160A. An ingress fabric endpoint may use different open paths from one of inputs 154 to the intended output 162 to switch consecutive cells (by sequence number), each open path having a different latency. As a result, fabric cells for the cell sequence from the ingress fabric endpoint may arrive out of order at the egress fabric endpoint.

While generally described as a three-stage switch network such as network 150, in other examples fabric planes described herein may contain different another type of switch architecture. For example, the second stage in a three-stage network may be replaced with another three-stage network, thereby forming a five-stage network.

Figure 4:
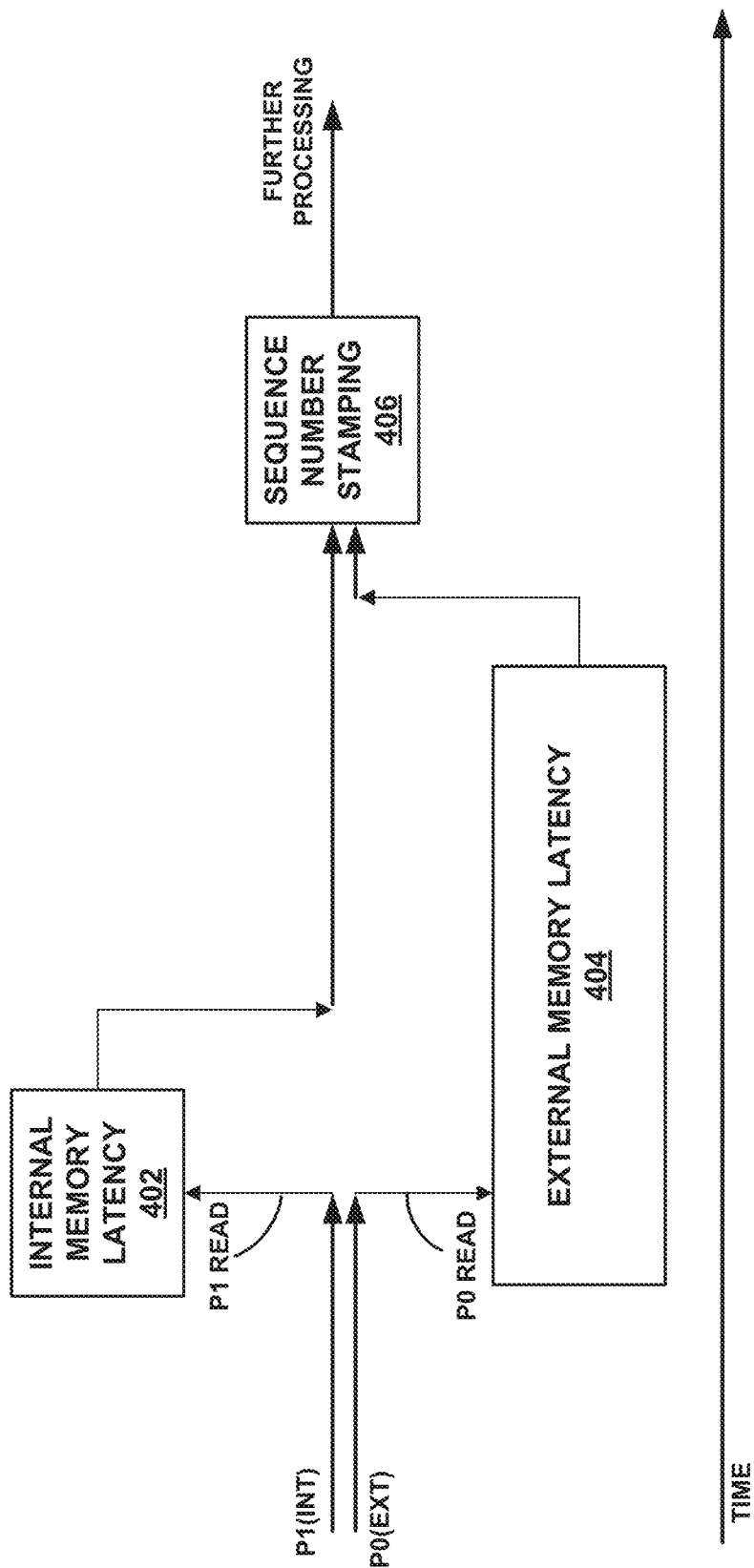
FIG. 4 is a conceptual diagram illustrating different memory latencies for uncongested packet flows and congested packet flows received by an ingress fabric endpoint, in accordance with techniques described herein.

FIG. 4 is a flow diagram conceptual diagram illustrating different memory latencies for uncongested packet flows and congested packet flows received by an ingress fabric endpoint, in accordance with techniques described herein. A packet flow may be received as a set of data pointers, along with an Egress/Destination ID (fabric endpoint number) and a VOQ ID (virtual output queue/flow in the Destination fabric endpoint). Ingress fabric endpoint 20A may send packet flows as cell streams across switch fabric 18 to multiple egress fabric endpoints 20. As described herein, a packet flow here may represent network traffic destined to a virtual output queue (VOQ) of, e.g., egress fabric endpoint 20B.

Packet data corresponding to packet flows to be transmitted from ingress fabric endpoint 20A to egress fabric endpoint 20B may be read from internal memory (e.g., on-chip SRAM) or from external memory (e.g., DRAM) and converted to cell streams for switching across switch fabric 18. The internal or external memory may act as a buffer of ingress fabric endpoint 20A for packet information such that ingress fabric endpoint 20A fetches packet data from the internal or external memory prior to generating cell streams from the packet data for switching across switch fabric 18 to egress fabric endpoint 20B. Ingress fabric endpoint 20A may use an internal memory to store packet data for uncongested flows, while ingress fabric endpoint 20A may use external memory to store packet data for congested flows. As described herein, a "congested packet flow" refers to a packet flow that has one or more delayed packets. Typically, a packet flow becomes congested when a queue somewhere along a network path for the packet flow is at capacity, which causes delays in the switching of packets for the packet flow from the network device or, more specifically, from ingress fabric endpoint 20A to the egress fabric endpoint 20 for the packet flow.

Ingress fabric endpoint 20A may track a congestion status for each packet flow. In some examples, ingress fabric endpoint 20A track the congestion status of each packet flow by maintaining a queue length for packets of each received packet flow. Ingress fabric endpoint 20A compares the queue length for a packet flow to a threshold to determine whether the packet flow is congested or uncongested. For example, upon determining that the queue length for the packet flow is less than the threshold, ingress fabric endpoint 20A determines that the flow is uncongested. As another example, upon determining that the queue length for the packet flow is greater than the threshold, ingress fabric endpoint 20A determines that the flow is congested. In some examples, the threshold is configurable by a user. Generally, ingress fabric endpoint 20A stores data for all packet flows in an internal memory. Upon determining that a packet flow has become congested, ingress fabric endpoint 20A switches data for the packet flow to an external memory, while data for other packet flows that are uncongested are continued to be stored in the internal memory.

Packet data switched by ingress fabric endpoint 20A to egress fabric endpoint 20B should honor particular ordering requirements. Specifically, ingress fabric endpoint 20A should maintain an order of pages within a packet flow. However, ingress fabric endpoint 20A may reorder an order of pages between different packet flows. To assist in reordering or buffering the flow data for transmission to egress fabric endpoint 20B, sequence module 30A processes packets of packet flows into a cell stream and assigns a sequence number to each cell of the cell stream prior to switching the cell stream across switch fabric 18 to egress fabric endpoint 20B. Egress fabric endpoint 20B uses the sequence number to reorder received cells to ensure that the order of the cell stream, and thus the order of packets within each packet flow represented in the cell stream, remains intact. The number of VOQs may be large, and therefore maintaining the sequence number per-VOQ (per-flow) may be prohibitively expensive to implement in hardware. Thus, as described herein, sequence module 30A assigns sequence numbers per-fabric endpoint 20 (e.g., a set of VOQs) and maintains order per-fabric endpoint 20.

In some examples, ingress fabric endpoint 20A stores data for a single packet flow (managed using a VOQ for an egress fabric endpoint 20) in either internal or external memory. Typically, the read latency of the external memory 404 is much higher, perhaps by multiple microseconds, than a read latency of the internal memory 402. Thus, to process traffic flows in an efficient manner, ingress fabric endpoint 20A may store data for uncongested traffic flows in the internal memory, while storing data for congested traffic flows in the external memory. In some examples, ingress fabric endpoint 20A stores a sequence of data packets (e.g., for a single packet flow or for multiple packet flows) in a combination of internal and external memory. For example, ingress fabric endpoint 20A stores a sequence of data packets for a single packet flow in both internal and external memory because a packet flow has transitioned from a congested to an uncongested state. Thus, different pages of a packet flow may have different latencies for reading data from a memory of ingress fabric endpoint 20A, for some pages of the packet flow are buffered in internal memory, while other pages of the packet flow are buffered in external memory. As used herein, "pages" refers to memory pages to which packets are stored and is used herein to refer to the stored packets, and vice-versa. As depicted in the example of FIG. 4, an ingress fabric endpoint receives a pointer for packet P0, which belongs to a first packet flow which is or has been congested. The ingress fabric endpoint, using the pointer for P0, reads the packet P0 from an external memory for the ingress fabric endpoint. Shortly thereafter, the first packet flow becomes uncongested and packets for the first packet flow are stored to internal memory. The ingress fabric endpoint receives a pointer for packet P1, which also belongs to the first packet flow. The ingress fabric endpoint, using the pointer for P1, reads the packet P1 from an internal memory of the ingress fabric endpoint due to the uncongested status of the first traffic flow. If all data in the first packet flow shares a single ordering sequence, because the sequence of the first packet flow includes some number of congested pages that are externally buffered (e.g., packet P0) and some number uncongested pages that are internally buffered (e.g., packet P1), packet P1 may race ahead of packet P0. In other words, absent techniques described herein, due to latency differences between the internal and external memory for a conventional ingress fabric endpoint, the conventional ingress fabric endpoint would perform sequence number stamping 406 on packet P1 prior to performing sequence number stamping 406 on earlier-in-time packet P0 such that the ingress fabric endpoint would violate the ordering requirements for the first packet flow.

To honor the ordering sequence requirements, a conventional reorder engine of an egress fabric endpoint buffers and delays flow data for an uncongested page of a packet flow which may arrive multiple microseconds before a congested page of the packet flow is received due to the large read latency differences between the internal and external memories of the conventional ingress fabric endpoint. This may decrease overall performance and throughout of a conventional network device because the conventional network device must delay a first, uncongested packet flow due to the presence of a second, congested packet flow that may be unrelated to the first packet flow.

Alternatively, a conventional ingress fabric endpoint may delay an uncongested packet flow such that all packet flows are initially converted into cell streams in order. For example, a conventional ingress fabric endpoint may add an extra buffering cost to uncongested packet flows to preserve the cell stream order. However, this extra buffering cost causes undesirable jitter in uncongested flows. Further, to maintain performance, a conventional ingress fabric endpoint may be required to impose a delay on packet flow data stored on the internal memory that is as long as a latency of the external memory, which may dramatically reduce the speed at which a conventional ingress fabric endpoint may process and forward uncongested packet flows.

Figure 5:
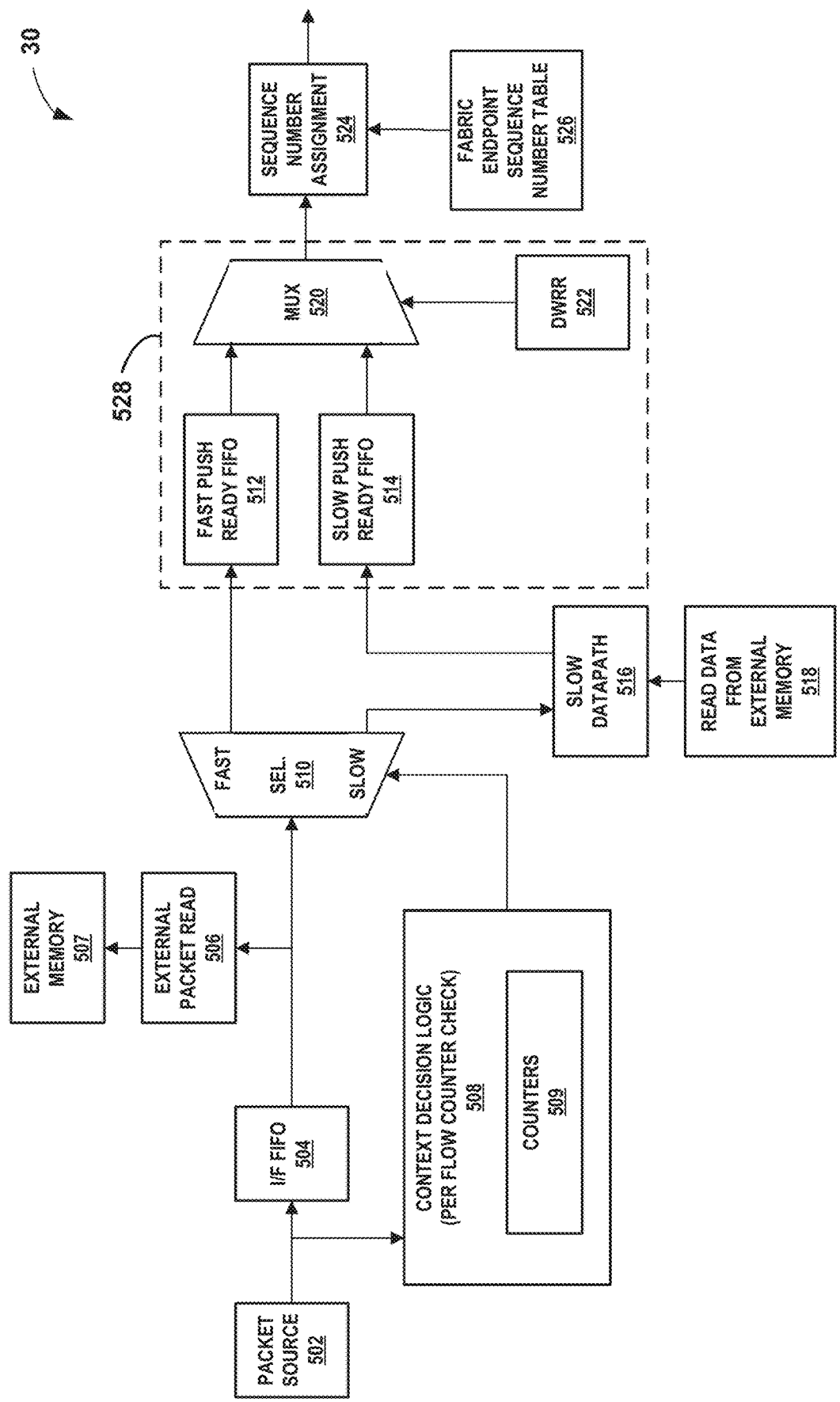
FIG. 5 is a block diagram illustrating, in detail, an example of one of the sequence modules of FIG. 2 in accordance with the techniques of the disclosure.

FIG. 5 is a block diagram illustrating, in detail, an example of one of sequence modules 30 of FIG. 2 in accordance with the techniques of the disclosure. The example sequence module 30 of FIG. 5 may be an example of sequence module 30A of ingress fabric endpoint 20A or sequence module 30B of ingress fabric endpoint 20B of FIG. 2.

The techniques of the disclosure recognize that if a sequentially first page of a first flow is to be read from external memory 507 and a sequentially second page of the first flow is to be read from internal memory, then the second page in the internal memory will be available first, even though the second page arrived later. This occurs due to considerable latency difference in read times between the internal and external memories. However, to ensure that the pages within the first flow maintain order, sequence module 30 should not read the second page from the internal memory until after reading the first page from the external memory. Furthermore, sequence module 30 may continue to forward pages for other, uncongested flows for the same fabric endpoint 20 to prevent blocking of other packet flows that do not need to maintain order with respect to the first flow. For example, if these other packet flows are stored in internal memory, then the other packet flows may progress in front of (and irrespective) of the first flow which has pages queued in external memory.

In accordance with the techniques of the disclosure, sequence module 30 segregates packet flows which have at least a one page in external memory from flows which have pages only in internal memory. For example, sequence module 30 implements two data paths for processing packet flows, referred to herein as a "fast path" and a "slow path." As is described in more detail below, sequence module 30 assigns packets of uncongested packet flows to the fast path and packets of congested packet flows to the slow path so as to allow packets of the uncongested packet flows to be processed and switched across switch fabric 18 before congested packet flows assigned to the slow path.

As described herein, packet flows that have pages only in internal memory are referred to as "fast flows." Typically, uncongested packet flows are stored only in internal memory, and therefore are typically fast flows. Packet flows that have pages stored in external memory are referred to as "slow external flows." Typically, congested flows are stored only in external memory, and therefore are typically slow flows. Further, packet flows which have pages in external memory that have not yet been processed, but for which subsequent pages are stored in internal memory are referred to as "slow internal flows." This scenario arises for packet flows that were originally congested, and therefore sequence module 30 originally assigned packets for the congested packet flows to the slow path in external memory. However, subsequently the packet flows became uncongested, such that sequence module 30 assigns subsequent packets for the packet flows to the fast path in internal memory. Without the techniques of the disclosure, as described above with respect to FIG. 4, the uncongested pages for the slow internal flows that are stored in internal memory may race ahead of the congested pages for the slow internal flows that are stored in external memory, breaking the sequence order for the flows.

In accordance with the techniques of the disclosure, upon reading pages from external memory for congested packet flows, sequence module 30 includes merge point 520 (also referred to as "multiplexer 520" or MUX 520) for merging flows that traverse the fast path and slow path prior to sequence number assignment 524. Merge point 520 occurs before fetching data from internal memory to allows for multiple processing threads to fetch data from internal memory, thereby further improving performance of sequence module 30. Because the sequence numbers have already been stamped, mis-ordering by the use of the multiple threads may be prevented. Thus, sequence module 30 may subsequently reorder sequence of packets between different packet flows by delaying sequence number stamping of packets for congested packet flows until after sequence module 30 reads pages for congested packets from the external memory.

Further, using the techniques described herein, sequence module 30 may avoid misordering, prior to merge point 520, of packets within a single packet flow which has a sequence of packets assigned to both the fast path and the slow path. For example, sequence module 30 receives, from packet source 502, a plurality of packets for a plurality of packet flows. For each packet of each packet flow of the plurality of packet flows, sequence module 30 determines, at the start of transmission processing, whether to assign the packet to the fast path for packet switching or the slow path for packet switching. For example, if a packet is indicated as externally buffered, sequence module 30 assigns the packet to the slow path and increments counter 509 for the packet flow. When the packet data for the packet assigned to the slow path is available, the packet buffered in external memory is read (506) from external memory 507. Prior to merging at merge point 520, sequence module 30 maintains a strict FIFO order 504 of packets within each of the fast path and the slow path using fast push ready FIFO 512 and slow push ready FIFO 514, respectively. That is, sequence module 30 pushes fast path-assigned and slow path-assigned packets to a respective fast path queue (FIFO 512) and a slow path queue (FIFO 514).

In most cases, sequence module 30 buffers packets assigned to the fast path in internal memory, while sequence module 30 buffers packets assigned to the slow path in external memory. However, if a packet flow transitions to uncongested and an internally-buffered packet for the packet flow follows closely after an externally-buffered packet for the same packet flow, the internally-buffered packet may race ahead to merge point 520, violating ordering requirements. Accordingly, in some examples, sequence module 30 assigns an internally-buffered packet to the slow path to maintain the proper order. To prevent subsequently-received packets of a first flow that are assigned to the fast path from racing ahead of previously-received packets of the same first flow that have been assigned to the slow path, sequence module 30 implements context decision logic 508 to maintain a per-flow counter 509 of the number of outstanding packets assigned to the slow path. Per-flow counter 509 allows sequence module 30 to keep track of the number of packets or pages assigned to and remaining in the slow path for a packet flow. For example, sequence module 30 increments counter 509 for a packet flow upon assigning a packet of the packet flow to the slow path, and decrements counter 509 upon outputting a packet of the packet flow from the slow path to merge point 520. Further, upon receiving an internal page for a packet flow for which counter 509 is non-zero, sequence module 30 may assign the internal page to the slow path to maintain the order of the flow. Sequence module 30 may maintain a separate counter 509 for each packet flow. In some cases, the counter may be a count of the number of packets in a slow path queue for the slow path.

If the packet is indicated as internally buffered and counter 509 is zero, then sequence module 30 assigns the packet to the fast path via selector operation 510. In effect, sequence module 30 may send the packet for forwarding to merge point 520 in a FIFO order for the fast path. Sequence module 30 performs sequence number assignment 524 to stamp the packet with a next sequence number for the corresponding cell stream. In some examples, sequence module 30 refers to sequence number table 526 for the next sequence number for assignment to the packet. Further, sequence module 30 reads the packet, and generates and switches cell data for the packet to egress fabric endpoint 20B.

If the packet is internally buffered but counter 509 is non-zero, sequence module 30 assigns the packet to the internal slow path 516 to prevent the packet from racing ahead of prior-sequenced packets for the same flow that have not yet been processed from the slow path. This forces the packet to be delayed internally until all preceding external-fetched data has been read from external memory (518) for that packet flow, so as to ensure that all packets for that packet flow are output to merge point 520 in correct order.

As will be described in more detail below, sequence module 30 may include merging stage 528 that includes fast push ready FIFO 512, slow push ready FIFO 514, merge point 520, and round robin scheduler 522. Packets assigned to the fast path for packet switching may be queued in FIFO 512 according to a first-in, first, out scheme for outputting to merge point 520, Similarly, packets assigned to the slow path for packet switching may be queued in FIFO 514 according to a first-in, first, out scheme for outputting to merge point 520. Merge point 520 merges packets from fast push FIFO 512 and slow push FIFO 514 for sequence number assignment 514 and switching across switch fabric 518. In some examples, merge point 520 uses a round robin scheduler, such as a deficit-weighted round-robin (DWRR) scheduler, to ensure that packets from the fast path and slow path are processed and output from ingress fabric endpoint 20A evenly.

The following example may illustrate the operation of sequence module 30. In this example sequence module 30 receives 2 flows. Flow A is uncongested and has packets only in internal memory, whereas flow B originally was uncongested and so had packets in internal memory, at some point in time became congested and so had subsequent packets shifted to external memory, and finally became uncongested and so subsequent packets were shifted back to internal memory. The sequence of packets, with packet P0 being first to arrive and packet P4 being last to arrive, are as follows:
1. Packet P0 (Flow A)
2. Packet P1 (Flow B, External)
3. Packet P2 (Flow A)
4. Packet P3 (Flow B, Internal)
5. Packet P4 (Flow A)

Packet P0 Processing:
Sequence module 30 checks per-flow counter 509 for packet P0. Because packet P0 belongs to flow A, which has packets only in internal memory, the per-flow counter of flow A is 0. Thus, sequence module 30 pushes packet P0 to the fast data path.

Packet P1 Processing:
Packet P1 belongs to flow B and is an external packet. Thus, sequence module 30 increments per-flow counter 509 for flow B and pushes packet P1 to the slow data path.

Packet P2 Processing:
Packet P2 belongs to flow A, which has packets only in internal memory. After checking per-flow counter 509 for packet P2, sequence module 30 pushes packet P2 to the fast data path.

Packet P3 Processing:
Packet P3 belongs to flow B. Sequence module 30 checks per-flow counter 509 for packet P3. Because flow B already has an external packet in the slow data path, per-flow counter 509 is non-zero. Accordingly, sequence module 30 pushes packet P3 to the slow data path to maintain the per-flow order of packets within flow B.

Packet P4 Processing:
Packet P4 belongs to flow A. After checking per-flow counter 509 for packet P4, sequence module 30 pushes packet P4 to the fast data path. Thus, it may be recognized that packets of flow A, which is uncongested, may be received subsequent to packets of flow B, which is congested, but the packets of flow A may be output for processing and switching by sequence module 30 prior to processing and switching of the packets of flow B. Further, flow A, which has packets only in internal memory, is not affected (e.g., blocked or delayed) by flow B, which has packets in external memory.

Figure 6:
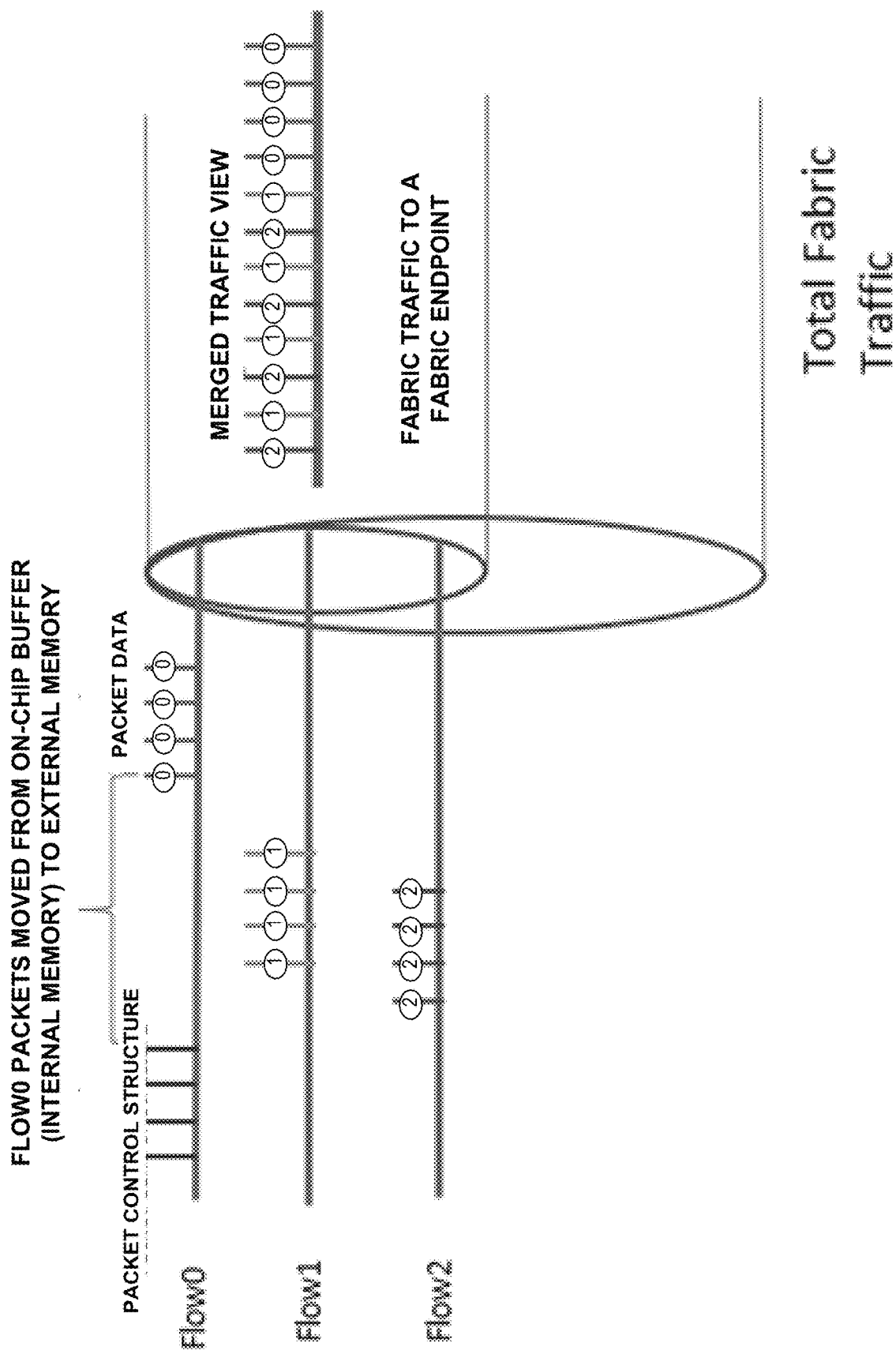
FIG. 6 is a block diagram illustrating an example conceptual diagram for merging congested and uncongested traffic flows in accordance with the techniques of the disclosure.

FIG. 6 is a block diagram illustrating an example conceptual diagram for merging congested and uncongested traffic flows in accordance with the techniques of the disclosure. In some examples, the merging of congested and uncongested traffic flows is performed by merge point 520 of sequence module 30 of FIG. 5. In the example of FIG. 5, sequence module 30 receives 3 flows: flow 0, flow 1, and flow 2. Flows 1 and 2 are uncongested, while flow 0 is congested. Sequence module 30 assigns, based on the congestion status of each flow, packets of flow 0 to the slow path and packets of flows 1 and 2 to the fast path. Sequence module 30 may buffer the packets of flow 0 in external memory until the data for the packets of flow 0 becomes available. Merge point 520 may merge packets for flows 0, 1, and 2 according to an availability of each of the packets. For example, because packets of flows 1 and 2 are assigned to the fast path, the packets of flows 1 and 2 are available for immediate processing. Merge point merges packets of each of flows 1 and 2 according to a round-robin scheduler (e.g., outputting a packet from flow 2, then a packet of flow 1, and so on). Once sequence module 30 outputs the packets of uncongested flows 1 and 2 for processing, sequence module 30 may output the packets of congested flow 2 as the data for the packets becomes available. Thus, by assigning flows 0, 1, and 2 to one of the fast path and slow path based on a congestion status of each flow, sequence module 30 enables packets of uncongested flows 1 and 2 to bypass the packets of congested flow 0 such that the congested nature of flow 0 does not impact uncongested flows 1 and 2.

Figure 7:
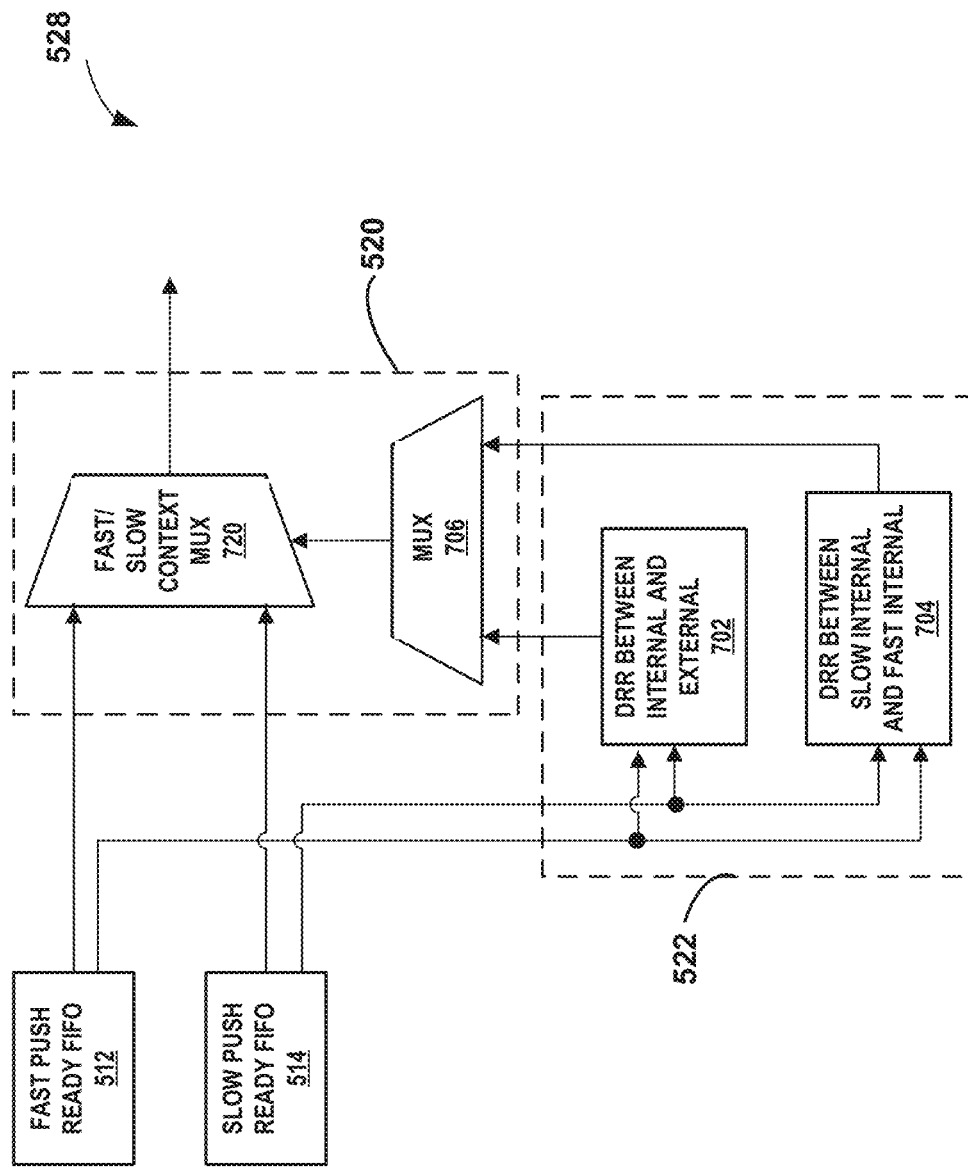
FIG. 7 is a block diagram illustrating an example of the merging stage of FIG. 5 for merging fast and slow paths of a sequence module in accordance with the techniques of the disclosure.

FIG. 7 is a block diagram illustrating example merging stage 528 of FIG. 5 for merging fast and slow paths of sequence module 30A in accordance with the techniques of the disclosure. Fast push FIFO 512, slow push ready FIFO 514, round robin scheduler 522, and merge point 520 may operate in a substantially similar fashion to the like components of FIG. 5.

Fast Push Ready FIFO 512 queues internal packets, e.g., Fast Internal packets. Slow Push Ready FIFO 514 queues both internal and external packets, e.g., External and Slow Internal packets. Once pages on the slow path are ready for output, then packets for the fast path queued in fast path FIFO 512 and packets for the slow path queued in slow path FIFO 514 may be merged into a single stream using round robin scheduler 522 and multiplexor 706 and multiplexor 720 of merge point 720. In some examples, round robin scheduler 522 implements deficit round robin (DRR). To maintain fairness, scheduler 522 maintains credits for a fast internal page bucket, a slow internal page bucket, an internal page bucket, and an external page bucket.

In one example, scheduler 522 includes 2 DRRs—DRR 702 and DRR 704. DRR module 702 applies deficit round robin to merge data packets traversing the fast internal path with data packets traversing the slow internal path. DRR 704 merges data packets on the internal path (e.g., data packets for the merged fast internal and slow internal paths) with data packets on the external path.

For example, if Slow Push Ready FIFO 514 has an external packet at the head, merging stage 528 runs DRR 704 between internal packets and external packets. If merging stage 528 selects an external packet for dequeueing, DRR 704 charges credits to the external page bucket. If merging stage 528 selects an internal packet for dequeueing, then DRR 704 charges credits to both the internal page bucket and the fast internal page bucket. If Slow Push Ready FIFO 514 has an internal packet at the head, merging stage 528 runs DRR 702 between a slow internal packet and a fast internal packet. If merging stage 528 selects a slow internal packet for dequeueing, DRR 702 charges credits to the slow internal page bucket and the internal page bucket. If merging stage 528 selects a fast internal packet for dequeueing, DRR 702 charges credits to the fast internal page bucket and the internal page bucket. Once scheduler 522 selects a page, scheduler 522 pops the page from the selected FIFO 512, 514 and sends the packet for sequence number stamping and egress.

Figure 8:
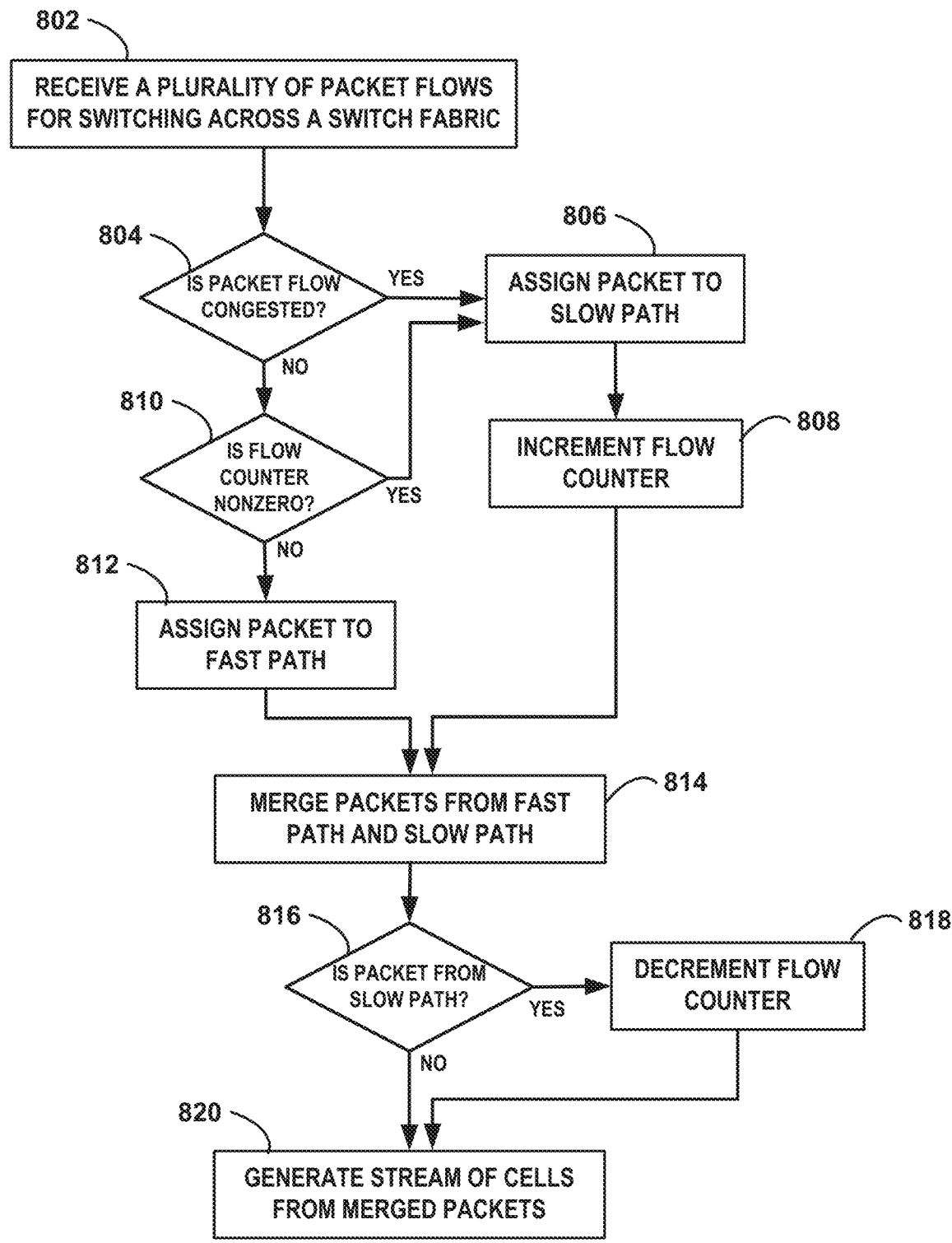
FIG. 8 is a flowchart illustrating an example operation in accordance with the techniques of the disclosure.

FIG. 8 is a flowchart illustrating an example operation in accordance with the techniques of the disclosure. For convenience, FIG. 8 is discussed with respect to HG 2.

Ingress fabric endpoint 20A receives a plurality of packet flows for switching across switch fabric 18 to egress fabric endpoint 20B (802). The plurality of packet flows include packet flows that are congested and packet flows that are uncongested. A "congested packet flow" is a packet flow that has one or more delayed packets. Typically, a packet flow becomes congested when a queue somewhere along a network path for the packet flow is at capacity, which causes delays in the switching of packets for the packet flow from ingress fabric endpoint 20A across switch fabric 18. In the example of FIG. 8, ingress fabric endpoint 20A receives a first packet of a first packet flow that is congested. After receiving the first packet of the first packet flow, ingress fabric endpoint 20A receives a second packet of a second packet flow that was previously congested but has become uncongested. After receiving the second packet of the second packet flow, ingress fabric endpoint 20A receives a third packet of a third packet flow that is uncongested.

Sequence module 30A of ingress fabric endpoint 20A assigns each packet for each packet flow of the plurality of packet flows to a fast path for packet switching or a slow path for packet switching. To assign each packet for each packet flow to the fast path or the slow path, sequence module 30A determines whether the packet flow is congested (804). For example, in response to determining that the first packet flow is congested ("YES" block of 804), sequence module 30A assigns a first packet of the first packet flow to the slow path (806). For each packet of the first packet flow assigned to the slow path, sequence module 30A increments a flow counter for the first packet flow (808). The flow counter for the first packet flow indicates a number of packets of the first packet flow currently assigned to the slow path.

As another example, in response to determining that the second packet flow is uncongested ("NO" block of 804), sequence module 30A determines whether a flow counter for the second packet flow indicates a non-zero number of packets of the second packet flow are currently assigned to the slow path (810). In response to determining that the flow counter for the second packet flow indicates a non-zero number of packets of the second packet flow are currently assigned to the slow path ("YES" block of 810), sequence module 30A assigns a second packet of the second packet flow to the slow path (806) and increments the flow counter for the second packet flow (808).

As another example, in response to determining that the third packet flow is uncongested ("NO" block of 804) and in response to determining that a flow counter for the third packet flow indicates that no packets of the third packet flow are currently assigned to the slow path ("NO" block of 810), sequence module 30A assigns a third packet of the third packet flow to the fast path (812).

Sequence module 30A processes packets from the fast path and the slow path to generate a stream of cells for switching across switch fabric 18 to egress fabric endpoint 20B. For example, sequence module 30A merges packets from the fast path and the slow path (814). For each packet, sequence module 30A determines whether the packet was assigned to the slow path (816). In response to determining that a packet (e.g., the first packet of the first flow) was assigned to the slow path ("YES" block of 816), sequence module 30A decrements the flow counter for the first packet flow (818). After decrementing the counter, or alternatively, in response to determining that a packet was not assigned to the slow path ("NO" block of 816), sequence module 30A generates, from the merged packets, a stream of cells for switching across switch fabric 18 to egress fabric endpoint 20A (820). Thus, sequence module 30A maintains a FIFO ordering of the packets within each packet flow of the plurality of packet flows. Further, sequence module 30A may switch a packet of a first packet flow (e.g., a congested packet flow) after switching a packet of another packet flow (e.g., an uncongested packet flow such as the third packet flow) despite the packet of the first packet flow being received by ingress fabric endpoint 20A before the packet of the third packet flow.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor; or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A method comprising:
    receiving, by an ingress fabric endpoint of a plurality of fabric endpoints coupled to a switch fabric within a network device, a plurality of packet flows for switching across the switch fabric to an egress fabric endpoint of the plurality of fabric endpoints for the packet flows, wherein the plurality of fabric endpoints are configured to exchange cells across the switch fabric;
    assigning, by the ingress fabric endpoint and based at least on a congestion status of each packet flow of the plurality of packet flows, each packet for each packet flow of the plurality of packet flows to one of a fast path for packet switching or a slow path for packet switching, wherein assigning each packet comprises:
        assigning, by the ingress fabric endpoint and based at least on the congestion status of a first packet flow of the plurality of packet flows being congested, packets for the first packet flow to the slow path for packet switching; and
        assigning, by the ingress fabric endpoint and based at least on the congestion status of a second packet flow of the plurality of packet flows being uncongested, packets for the second packet flow to the fast path for packet switching; and
    processing, by the ingress fabric endpoint to generate a stream of cells for switching across the switch fabric to the egress fabric endpoint, packets from the fast path and the slow path to maintain a first-in-first-out ordering of the packets within each packet flow of the plurality of packet flows and to switch a packet of the first packet flow of the plurality of packet flows after switching a packet of the second packet flow of the plurality of packet flows despite the packet of the first packet flow being received by the ingress fabric endpoint before the packet of the second packet flow.

2. The method of claim 1,
    wherein receiving the plurality of packet flows for switching across the switch fabric to the egress fabric endpoint of the plurality of fabric endpoints for the packet flows comprises receiving the first packet flow prior to receiving the second packet flow, and
    wherein processing packets from the fast path and the slow path comprises processing packets of the second packet flow of the fast path prior to processing packets of the first packet flow of the slow path.

3. The method of claim 1, further comprising:
    incrementing, for each packet of the first packet flow that is assigned to the slow path for packet switching, a flow counter for the first packet flow; and
    decrementing, for each packet of the first packet flow that is processed from the slow path for packet switching, the flow counter for the first packet flow.

4. The method of claim 1,
    wherein the packet of the first packet flow is a first packet,
    wherein a flow counter for the first packet flow indicates a number of packets of the first packet flow currently assigned to the slow path, the method further comprising:
    in response to determining the flow counter for the first packet flow indicates a non-zero number of packets of the first packet flow are currently assigned to the slow path, assigning a second packet of the first packet flow to the slow path for packet switching; and
    in response to determining the flow counter for the first packet flow indicates no packets of the first packet flow are currently assigned to the slow path, assigning a third packet of the first packet flow to the fast path for packet switching.

5. The method of claim 1, wherein processing packets from the fast path and the slow path comprises merging packets of packet flows from the fast path with packet flows of the slow path and generating, from the merged packets, the stream of cells for switching across the switch fabric to the egress fabric endpoint.

6. The method of claim 1,
    wherein assigning a packet to the fast path comprises pushing the packet to a fast path queue, and
    wherein assigning a packet to the slow path comprises pushing the packet to a slow path queue once the packet has been read from external memory, and
    wherein processing packets from the fast path and the slow path comprises merging packets of packet flows by selectively dequeuing packets from the slow path queue and the fast path queue.

7. The method of claim 6, wherein a round-robin scheduler selectively dequeues the packets from the slow path queue and the fast path queue.

8. The method of claim 1, wherein assigning packets for the first packet flow of the plurality of packet flows to the slow path for packet switching comprises:
    assigning packets for the first packet flow to the slow path in response to determining packets of the first packet flow are currently stored to external memory for subsequent processing by the ingress fabric endpoint.

9. The method of claim 1,
    wherein the fast path for packet switching comprises an internal memory path of the network device, and
    wherein the slow path for packet switching comprises an external memory path of the network device.

10. A network device comprising a plurality of fabric endpoints coupled to a switch fabric within the network device, wherein the plurality of fabric endpoints are configured to exchange cells across the switch fabric, and wherein an ingress fabric endpoint of the plurality of fabric endpoints is configured to:
- receive a plurality of packet flows for switching across the switch fabric to an egress fabric endpoint of the plurality of fabric endpoints for the packet flows;
- assign, based at least on a congestion status of each packet flow of the plurality of packet flows, each packet for each packet flow of the plurality of packet flows to one of a fast path for packet switching or a slow path for packet switching, wherein to assign each packet, the ingress fabric endpoint is configured to
  - assign, based at least on the congestion status of a first packet flow of the plurality of packet flows being congested, packets for the first packet flow to the slow path for packet switching; and
  - assign, based at least on the congestion status of a second packet flow of the plurality of packet flows being uncongested, packets for the second packet flow to the fast path for packet switching; and
- process, to generate a stream of cells for switching across the switch fabric to the egress fabric endpoint, packets from the fast path and the slow path to maintain a first-in-first-out ordering of the packets within each packet flow of the plurality of packet flows and to switch a packet of the first packet flow of the plurality of packet flows after switching a packet of the second packet flow of the plurality of packet flows despite the packet of the first packet flow being received by the ingress fabric endpoint before the packet of the second packet flow.

11. The network device of claim 10,
wherein, to receive the plurality of packet flows for switching across the switch fabric to the egress fabric endpoint of the plurality of fabric endpoints for the packet flows, the ingress fabric endpoint is further configured to receive the first packet flow prior to receiving the second packet flow, and
wherein, to process packets from the fast path and the slow path, the ingress fabric endpoint is further configured to process packets of the second packet flow of the fast path prior to processing packets of the first packet flow of the slow path.

12. The network device of claim 10,
wherein the ingress fabric endpoint is further configured to:
- increment, for each packet of the first packet flow that is assigned to the slow path for packet switching, a flow counter for the first packet flow; and
- decrement, for each packet of the first packet flow that is processed from the slow path for packet switching, the flow counter for the first packet flow.

13. The network device of claim 10,
wherein the packet of the first packet flow is a first packet,
wherein a flow counter of the ingress fabric endpoint for the first packet flow indicates a number of packets of the first packet flow currently assigned to the slow path, and
wherein the ingress fabric endpoint is further configured to:
- in response to determining the flow counter for the first packet flow indicates a non-zero number of packets of the first packet flow are currently assigned to the slow path, assign a second packet of the first packet flow to the slow path for packet switching; and
- in response to determining the flow counter for the first packet flow indicates no packets of the first packet flow are currently assigned to the slow path, assign a third packet of the first packet flow to the fast path for packet switching.

14. The network device of claim 10, wherein, to process packets from the fast path and the slow path, the ingress fabric endpoint is further configured to merge packets of packet flows from the fast path with packet flows of the slow path and generate, from the merged packets, the stream of cells for switching across the switch fabric to the egress fabric endpoint.

15. The network device of claim 10,
wherein, to assign a packet to the fast path, the ingress fabric endpoint is further configured to push the packet to a fast path queue,
wherein, to assign a packet to the slow path, the ingress fabric endpoint is further configured to push the packet to a slow path queue once the packet has been read from external memory, and
wherein to process packets from the fast path and the slow path, the ingress fabric endpoint is further configured to merge packets of packet flows by selectively dequeuing packets from the slow path queue and the fast path queue.

16. The network device of claim 15, wherein the ingress fabric endpoint further comprises a round-robin scheduler configured to selectively dequeue the packets from the slow path queue and the fast path queue.

17. The network device of claim 10, wherein, to assign packets for the first packet flow of the plurality of packet flows to the slow path for packet switching, the ingress fabric endpoint is further configured to:
- assign packets for the first packet flow to the slow path in response to determining packets of the first packet flow are currently stored to external memory for subsequent processing by the ingress fabric endpoint.

18. A non-transitory, computer-readable medium comprising instructions that, when executed, are configured to cause one or more processors of an ingress fabric endpoint of a plurality of fabric endpoints, the plurality of fabric endpoints coupled to a switch fabric within a network device and the plurality of fabric endpoints configured to exchange cells across the switch fabric, to:
- receive a plurality of packet flows for switching across the switch fabric to an egress fabric endpoint of the plurality of fabric endpoints for the packet flows;
- assign, based at least on a congestion status of each packet flow of the plurality of packet flows, each packet for each packet flow of the plurality of packet flows to one of a fast path for packet switching or a slow path for packet switching, wherein to assign each packet, the ingress fabric endpoint is configured to:
  - assign, based at least on the congestion status of a first packet flow of the plurality of packet flows being congested, packets for the first packet flow to the slow path for packet switching; and
  - assign, based at least on the congestion status of a second packet flow of the plurality of packet flows being uncongested, packets for the second packet flow to the fast path for packet switching;
- process, to generate a stream of cells for switching across the switch fabric to the egress fabric endpoint, packets from the fast path and the slow path to maintain a first-in-first-out ordering of the packets within each packet flow of the plurality of packet flows and to switch a packet of the first packet flow of the plurality of packet flows after switching a packet of the second packet flow of the plurality of packet flows despite the packet of the first packet flow being received by the ingress fabric endpoint before the packet of the second packet flow.

* * * * *